(12) United States Patent (10) Patent No.: US 9,357,842 B2
Gu (45) Date of Patent: Jun. 7, 2016

(54) FOLDING WORKTABLE

(71) Applicant: Jun Gu, Jinhua (CN)

(72) Inventor: Jun Gu, Jinhua (CN)

( * ) Notice: Subject to any disclaimer, the term of this patent is extended or adjusted under 35 U.S.C. 154(b) by 0 days.

(21) Appl. No.: 14/600,608

(22) Filed: Jan. 20, 2015

(65) Prior Publication Data

US 2015/0201751 A1 Jul. 23, 2015

(30) Foreign Application Priority Data

Jan. 22, 2014 (CN) ...................... 2014 2 0038462 U

(51) Int. Cl.
*A47B 3/00* (2006.01)
*A47B 85/06* (2006.01)
*B25H 1/04* (2006.01)
*B25H 1/16* (2006.01)
*B25H 1/14* (2006.01)
*B62B 3/02* (2006.01)

(52) U.S. Cl.
CPC *A47B 85/06* (2013.01); *B25H 1/04* (2013.01); *B25H 1/14* (2013.01); *B25H 1/16* (2013.01); *B62B 3/02* (2013.01)

(58) Field of Classification Search
CPC ............ A47B 3/08; A47B 3/091; A47B 3/10; A47B 85/06; B62B 3/02; B62B 2202/52
USPC ............. 108/125, 129, 126, 130, 160, 90, 18; 280/30, 32.5, 47.24, 47.18; 182/20, 35, 182/28
See application file for complete search history.

(56) References Cited

U.S. PATENT DOCUMENTS

| 1,925,613 | A | * | 9/1933 | Stanger | .................. | A47B 37/00 108/11 |
| 2,150,878 | A | * | 3/1939 | De Saussure, Jr. | .. | A47B 3/0916 108/130 |
| 2,672,391 | A | * | 3/1954 | Moore | .................. | A47B 31/00 280/30 |
| 2,700,587 | A | * | 1/1955 | Godfrey | .................. | A47B 3/10 108/133 |
| 2,905,513 | A | * | 9/1959 | Kane | ........................ | A47B 3/00 108/128 |
| 2,944,862 | A | * | 7/1960 | Heil | ........................ | A47B 3/10 190/12 R |

(Continued)

FOREIGN PATENT DOCUMENTS

CN 201540742 U 8/2010
CN 202846515 U 4/2013

*Primary Examiner* — Janet M Wilkens
(74) *Attorney, Agent, or Firm* — Ware, Fressola, Maguire & Barber LLP

(57) ABSTRACT

A folding worktable including a frame and a board is disclosed. The frame has a pair of long borders, a pair of short borders and a number of support bars connected between the long borders. The board is locked on the frame. The worktable has four legs with telescopic units and four retractable folding braces for folding the legs. Each pair of retractable folding braces is connected to a different support bar. There are four casters on the four corners under the frame. When the retractable folding braces are folded and the legs are stored within the frame, the casters touch the ground. The board is a double sided board including a work-board and an anti-skid board which are fixed together. The worktable can also be used as a scaffold, a carrier and a repair skateboard.

15 Claims, 7 Drawing Sheets

(56) References Cited

U.S. PATENT DOCUMENTS

| | | | | |
|---|---|---|---|---|
| 3,028,205 A * | 4/1962 | Howe | A47B 3/0911 | 108/130 |
| 3,271,075 A * | 9/1966 | Good | A47C 16/02 | 108/129 |
| 3,296,983 A * | 1/1967 | Brush | A47B 25/00 | 108/166 |
| 4,341,164 A * | 7/1982 | Johnson | A47B 3/10 | 108/115 |
| 4,471,969 A * | 9/1984 | Zabala | A47C 4/52 | 108/129 |
| 5,092,615 A * | 3/1992 | Gregalis | B62B 3/02 | 108/13 |
| 5,217,125 A * | 6/1993 | Swanson | A47F 5/10 | 108/132 |
| 5,653,457 A * | 8/1997 | Marmer | B62B 3/02 | 280/30 |
| 6,375,055 B1 * | 4/2002 | Spykerman | B60R 5/045 | 108/12 |
| 6,401,631 B1 * | 6/2002 | Kane | A47B 3/0911 | 108/116 |
| 6,698,361 B2 * | 3/2004 | Lung | A47B 3/08 | 108/118 |
| 7,549,381 B1 * | 6/2009 | Nail, Jr. | A47B 3/0912 | 108/132 |
| 2005/0145148 A1 * | 7/2005 | Mason | A47B 1/02 | 108/130 |
| 2006/0037873 A1 * | 2/2006 | Elgart | A45C 9/00 | 206/223 |
| 2007/0261916 A1 * | 11/2007 | Sward | G01N 33/497 | 182/129 |
| 2009/0199746 A1 * | 8/2009 | Horton | A47B 3/00 | 108/129 |
| 2010/0032927 A1 * | 2/2010 | Gordon | A47B 3/10 | 280/659 |

* cited by examiner

FOLDING WORKTABLE

TECHNICAL FIELD

This present invention relates to a folding worktable which can be used as worktable, scaffold, carrier and creeper etc.

BACKGROUND ART

The common known worktable so far is single function and generally consists of folding support frame and board. For example, the China patent No. ZL200920211739.1 folding worktable including desktop, central support frame, feet stands, universal wheels. The characteristics are: The desktop is composed by left and right desk panels and are hinged jointed. Under the panel joint there is central support frame. The frame joints to feet stands by connecting pin. The feet stands' upper ends are installed to the bottom of left and right desk panels. The feet stands are designed with foldable device. The feed stands lower ends are installed with universal wheels and braking pedals. The feet stands are jointed by baffle board using connecting pins. The new design, compared to existed technology, is simple and compact structure, great support, extremely solid and takes up little room after folded. The whole worktable is light and stable, easy to carry, move and adjust. Besides, this new design is small investment, low cost and worth application promotion.

For another example China patent No. ZL201220580200.5 folding worktable, it goods publish a kind of tool disposition tool including platform and at least four support legs under it. The support legs are made by at two support bars which can mutually retracted. The platform and support legs can mutually rotate and connect through joints. The joint has locking device. The folding worktable's function is that it can compactly fold with lock device to keep it at lock status when it isn't used. And can open easily to a stable supporting status with freely adjustable height. It is also simple structure and low cost.

SUMMARY OF INVENTION

This present invention provides a folding worktable that can be used not only as worktable, but also be used as scaffold, carrier and repair skateboard etc, to extend application scope of worktable and satisfies diversified markets.

The above objectives are accomplished according to this utility model patent by providing: A folding worktable including a frame, a board and is upheld by four legs of retractable folding braces. Those legs have telescopic units and limit units which prop up the frame. Its characteristic is:

A folding worktable including a frame, a board and is upheld by four legs of retractable folding braces.

The frame is a rectangular frame including a pair of transverse borders and a pair of short borders with convex platform. The board is locked on the frame. The retractable folding braces are hinged underside of the frame. Four casters are installed on the four corners under the frame. When the retractable folding braces are folded and stored within the frame, four casters touch the ground;

The board is a double sided board including a work-board and an antiskid board which are mutually fit and fixed together.

Said board is a double sided board including a work-board and an antiskid board which are mutually fit and fixed together.

This utility model patent can be used as worktable, scaffold, carrier and repair skateboard etc. by selecting from the work-board or the antiskid board and folding or unfolding the retractable folding braces, extends application fields of worktable and satisfies diversified markets On the basis of the above solutions, wherein the frame has a mounting surface for the board, the top surface of the bosses is higher than the mounting surface, each border has at least one guiding limit plate, each guiding limit plate equips with a spring locker below; when the double sided board is inserted into the mounting surface via the slope of the guiding limit plate, it is located by the bosses and the guiding limit plates and locked onto frame by the spring locks; when the workboard is facing up, the board can be used as a worktable or creeper( ) and when the antiskid board is facing up, the board can be used as scaffold or carrier.

In a further embodiment, wherein the work-board is MDF (medium density fibre-board), it is fixed to the antiskid board by a pounding plate, pressing plates and fastening screws, the position of each pressing plate, groove of the MDF and groove of the antiskid board all corresponds to each spring locker, when the MDF and antiskid board fit together, the positions of the grooves of the MDF and grooves of the antiskid board are the same, and the MDF and antiskid board are locked together by spring lockers. The pounding plate is not only the fixing part, but also the pounding and cutting area of the worktable.

In a further embodiment, the MDF board has the pounding board being fixed on one side and a protractor drawing on the other side. The user can do drawings on the design area of the worktable.

In a further embodiment, wherein the antiskid board is a plastic board with antiskid grid pattern, such as PP antiskid board or ABS antiskid board etc.

In a further embodiment, wherein the MDF board and antiskid board both have through hole, the through holes of MDF board and antiskid board are the same size, when the MDF board and antiskid board are fit together, the through holes are concentric. The user can do drilling work on the worktable.

In a further embodiment, wherein there are plurality of parallel support bars between the borders and a support shaft between the bosses in the frame, buckles are fixed on the bottom of the support to secure the retractable folding braces when they are folded and stored, when the double sided board is positioned on the borders of the frame, the top surface of the bosses is higher than the top surface of the double sided board. The strength of the frame is increased by the support bars an support shaft. At this moment, the mounting surface is the top surface of the borders.

In yet a further embodiment, wherein the retractable folding braces has four legs, each two legs and a rung form a "H" shaped brace, and two "H" braces are hinged on the bottom of the two bosses, each leg has a prop with unidirectional folding spindle which connects to bottom of frame, the prop, the bottom of the frame and the legs form a triangle, the retractable folding braces prop up at the bottom of the frame and are limited by limit unit of the legs, there is a cylinder on the middle of each rung, when the four legs are retracted and folded inward, the props are folded along the unidirectional folding spindles and drive the retractable folding braces to fold inward, and the cylinders and the buckles of the support shaft will lock together, the retractable folding braces are folded under the bottom of the frame and the four casters that fixed on the bottom of the frame touch the ground for rolling.

In a further embodiment, wherein the two casters on right side are inside the right "H" shaped brace and can steer direction freely as guide casters, a pull ring set on the edge of the right short border with convex platform; the two casters on left side are outside the left "H" shaped braces and can only roll forward or backward as directional casters.

In a further embodiment, wherein a handle sets on the outside of at least one transverse border for being easily carried; at least one short border has slots or holes as the tool storage and the other short border has a socket to supply power to electric tools or the lights etc.

This patent has the advantages of that the worktable can also be used as scaffold, carrier and creeper etc. by simple structural grouping or transforming, extends application scope of worktable and satisfies diversified markets, and has simple structure, portable size, reliable firmness and stable performance.

The utility model patent will hereinafter to be described with drawings.

LABEL INSTRUCTIONS

Figure 1:
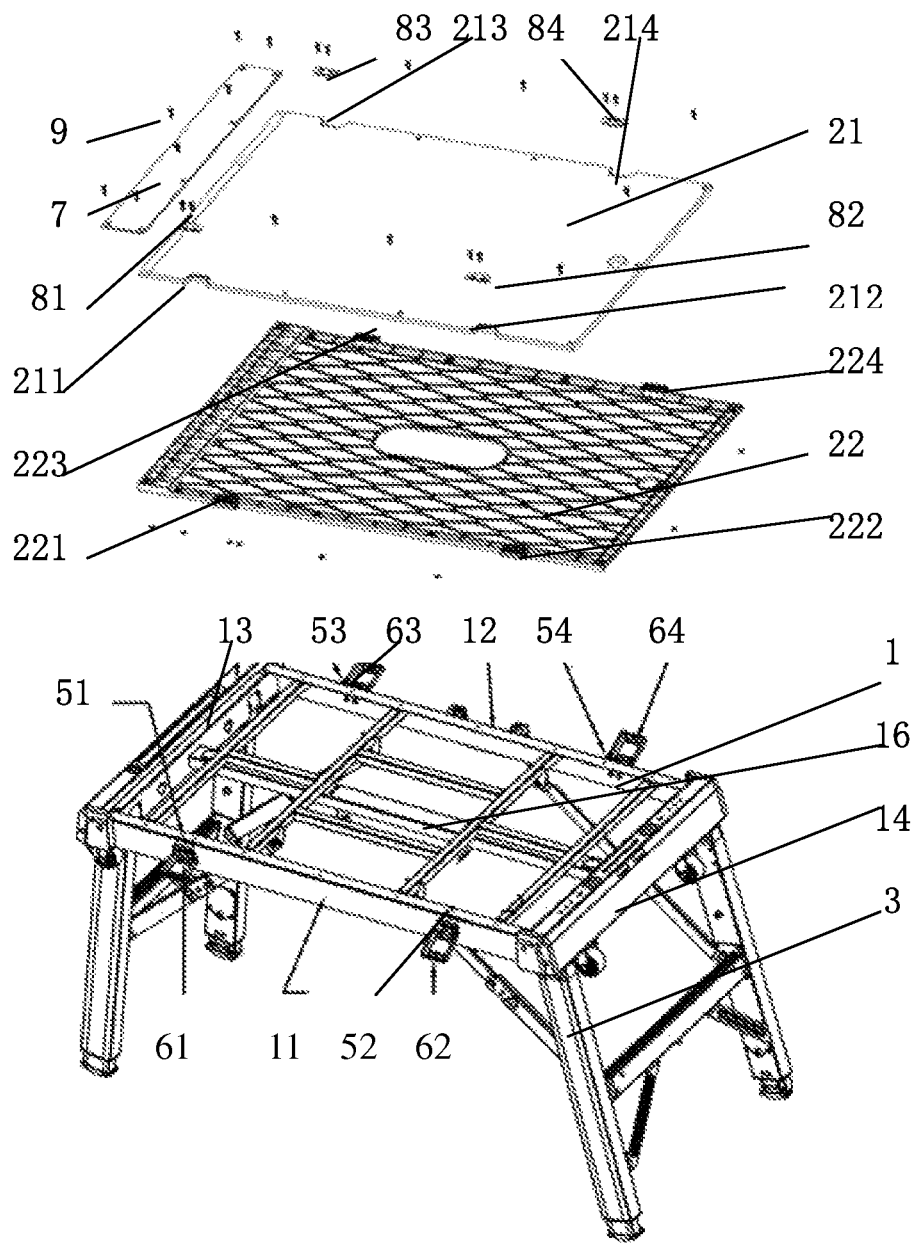
FIG. 1 is an exploded view of the worktable.

1—frame
11, 12—front and rear borders
13, 14—left and right bosses (short border)
151, 152, 153, 154—support bars No. 1, 2, 3, 4
16—support shaft
161, 162—left and right buckles
17—pull ring
18—socket
2—double sided board
21—MDF
211, 212, 213, 214—Grooves No. 1, 2, 3, 4 of the MDF board
215—protractor
216—through-hole of the MDF board
22—antiskid board
221, 222, 223, 224—Bulges No. 1, 2, 3, 4 of the antiskid board
225—antiskid grid pattern
226—through-hole of the antiskid board
3—retractable folding braces
31, 32—right and left "H" shaped braces
311, 312—$1^{st}$, $2^{nd}$ legs of the left "H" shaped brace
3111, 3121—left $1^{st}$, $2^{nd}$ props with unidirectional folding spindles
313—left rung
3131—left cylinder (or left cylinder buckle)
321, 322—$1^{st}$, $2^{nd}$ legs of the right "H" shaped support frame
3211, 3221—right $1^{st}$, $2^{nd}$ props with unidirectional folding spindles
323—right rung
3231—right cylinder (or right cylinder buckle)
33—limit units of legs
4—casters
41, 42, 43, 44—$1^{st}$, $2^{nd}$, $3^{rd}$, $4^{th}$ casters
51, 52, 53, 54—$1^{st}$, $2^{nd}$, $3^{rd}$, $4^{th}$ guiding limit plates
61, 62, 63, 64—$1^{st}$, $2^{nd}$, $3^{rd}$, $4^{th}$ spring locks
7—pounding plate
81, 82, 83, 84—$1^{st}$, $2^{nd}$, $3^{rd}$, $4^{th}$ pressing plates
9—fastening screws
10—handle.

DETAILED DESCRIPTION OF THE INVENTION

Example 1

Figure 2:
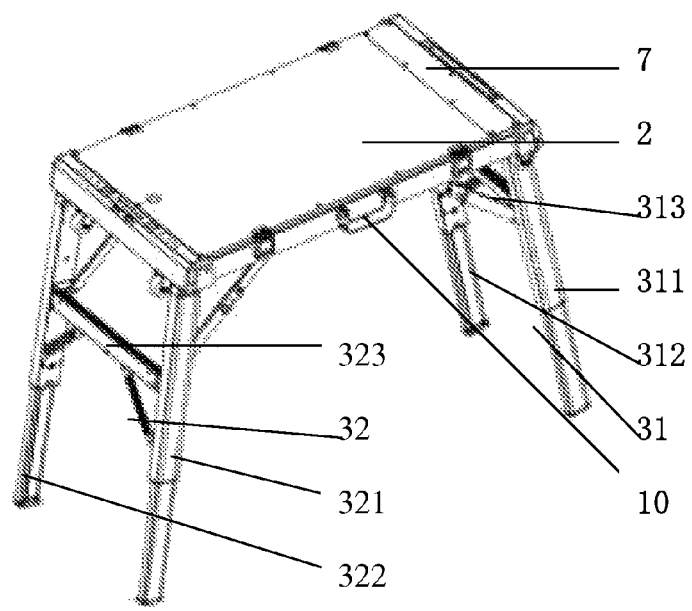
FIG. 2 is a back reference view of the assembling worktable from FIG. 1.
Figure 3:
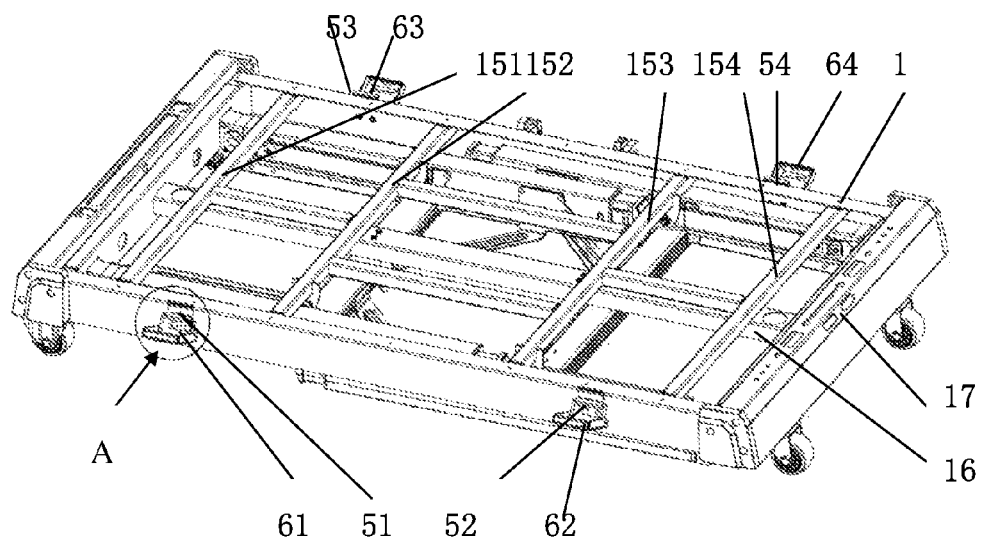
FIG. 3 is a reference view of the folded and stored worktable without the board.
Figure 4:
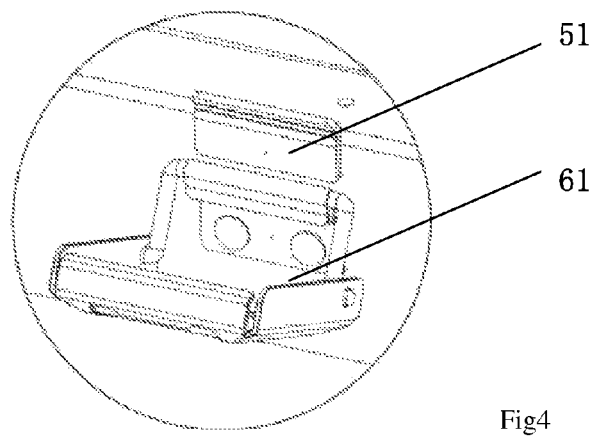
FIG. 4 is a partial enlarged view of FIG. 3.
Figure 5:
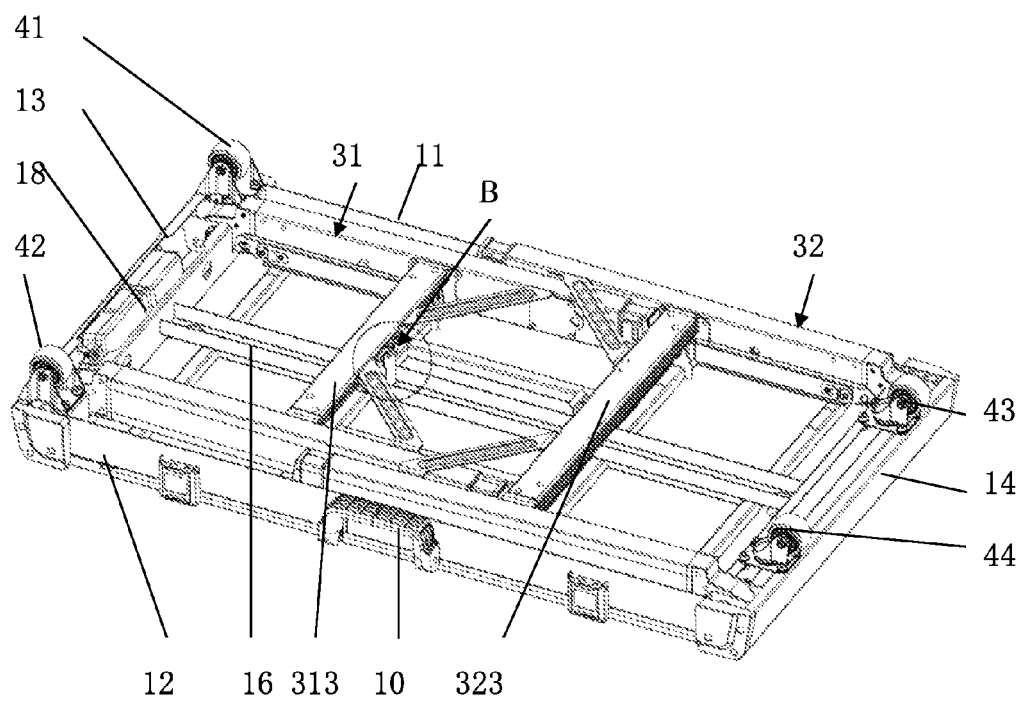
FIG. 5 is a top reference view of the folded and stored worktable.
Figure 6:
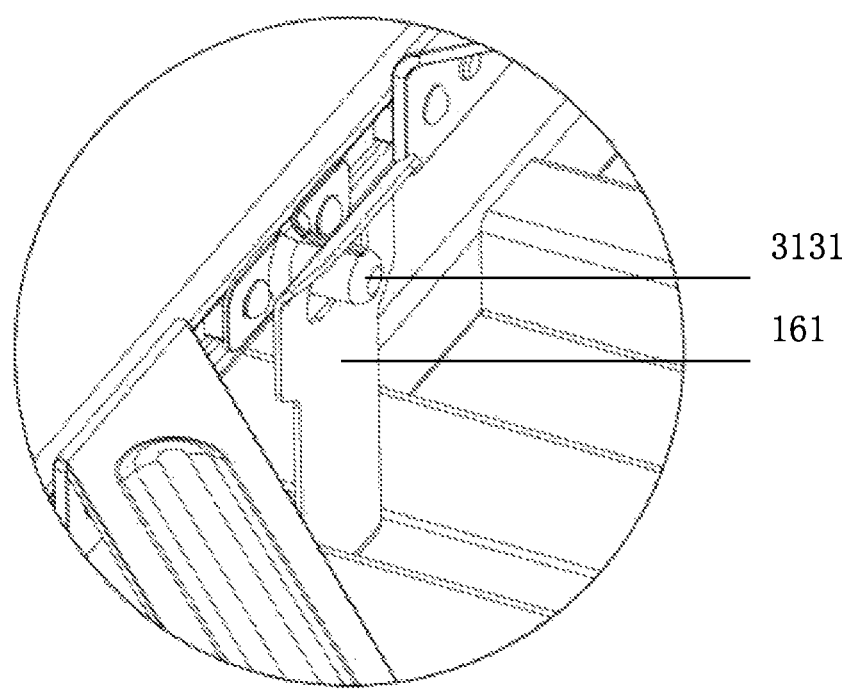
FIG. 6 is a partial enlarged view of FIG. 5.
Figure 7:
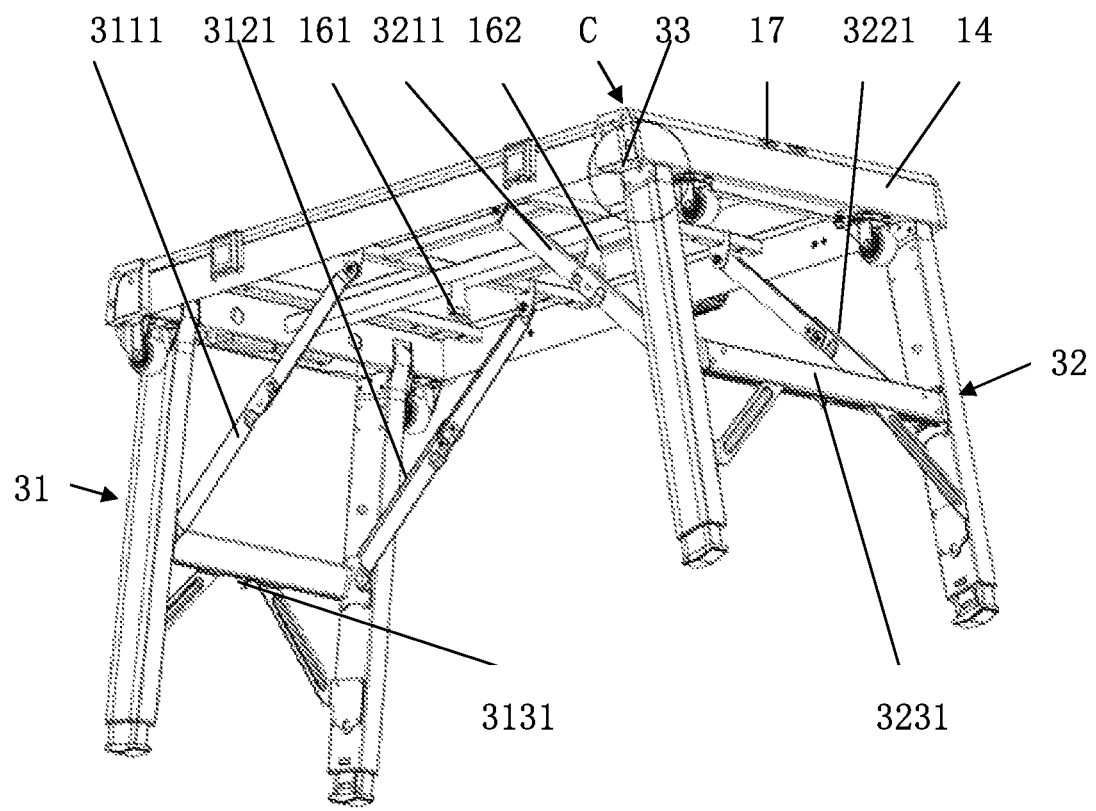
FIG. 7 is another reference view of the worktable, wherein the Part.C is a reference view of the limit unit.
Figure 8:
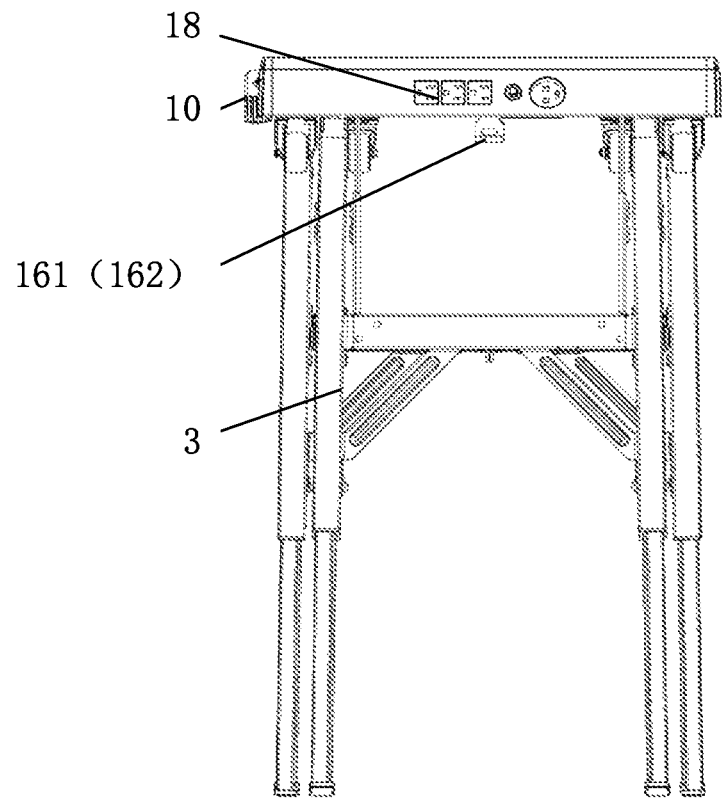
FIG. 8 is a left view of the worktable.
Figure 9:
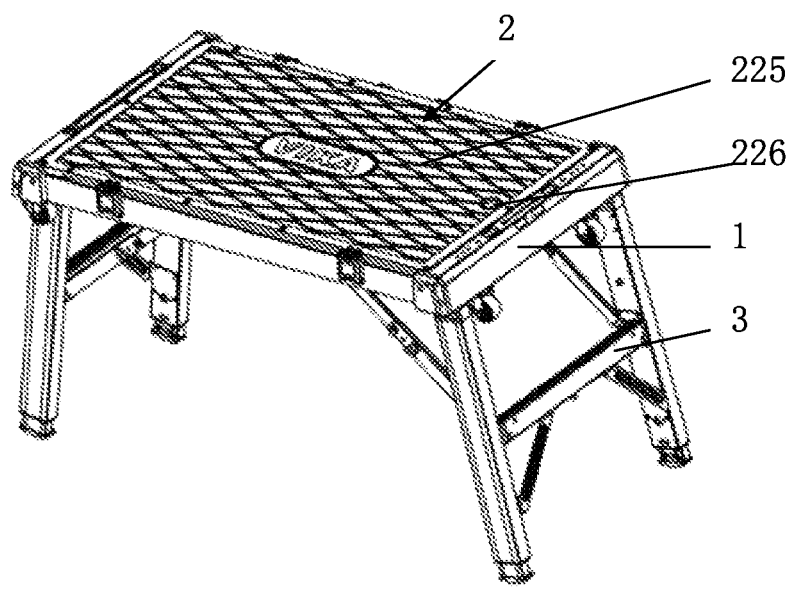
FIG. 9 is a reference view of the scaffold usage.
Figure 10:
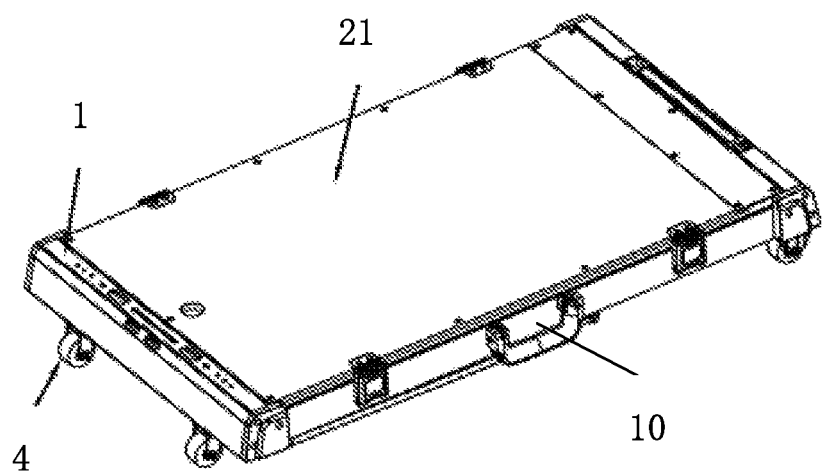
FIG. 10 is a reference view of the creeper usage.
Figure 11:
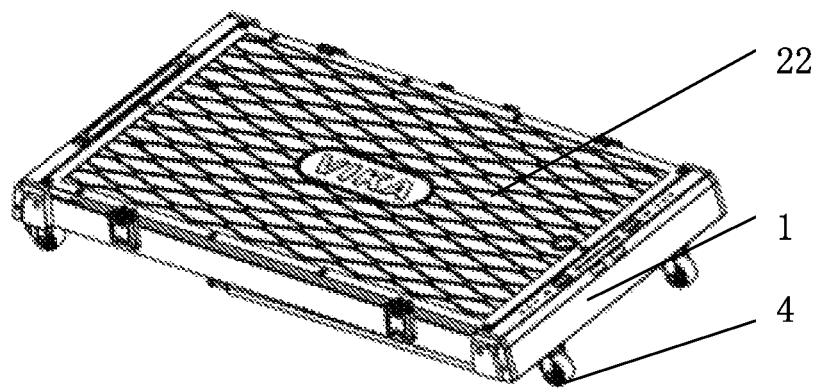
FIG. 11 is a reference view of the carrier usage.
Figure 12:
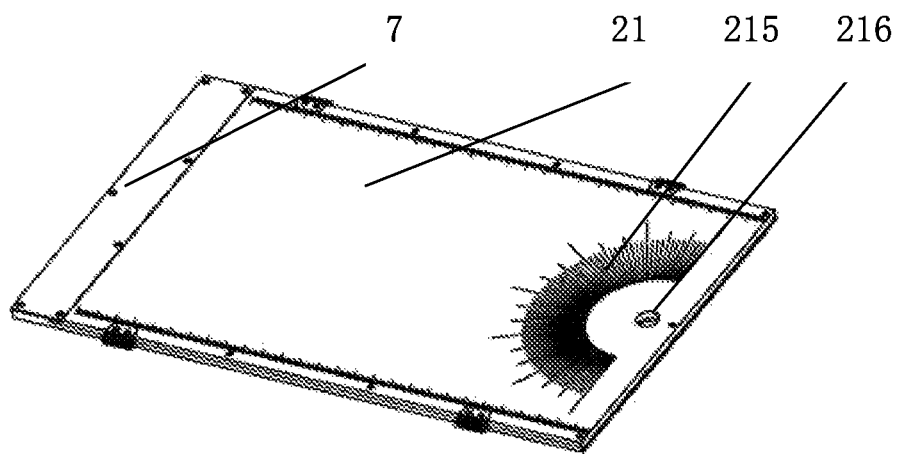
FIG. 12 is a reference view of the board.

With reference to FIG. 1 is an exploded view of the worktable; FIG. 2 is a back reference view of the assembling worktable from FIG. 1; FIG. 3 is a reference view of the folded and stored worktable without the board; FIG. 4 is a partial enlarged view of FIG. 3; FIG. 5 is a top reference view of the folded and stored worktable; FIG. 6 is a partial enlarged view of FIG. 5; FIG. 7 is another reference view of the worktable, wherein the Part. C is a reference view of the limit unit; FIG. 8 is a left view of the worktable; FIG. 9 is a reference view of the scaffold usage; FIG. 10 is a reference view of the creeper usage; FIG. 11 is a reference view of the carrier usage; FIG. 12 is a reference view of the board:

Referring now to FIG. 1 and FIG. 2, A folding worktable, which is household, including a frame 1, a board 2 and is upheld by four legs 311, 312, 321, 322 of retractable folding braces 3, the legs 311, 312, 321, 322 have telescopic units and limit units 33 which prop up the frame 1 according to FIG. 7, casters 4 are installed under the frame 1, characterized in that:

The frame 1 is a rectangular frame including front and rear borders 11, 12, left and right bosses 13, 14, the board 2 is locked on the frame 1. The retractable folding braces 31, 32 are hinged under the frame 1. The casters are $1^{st}$, $2^{nd}$, $3^{rd}$, $4^{th}$ casters 41, 42, 43, 44, which are installed on the four corners under the frame 1; referring now to FIG. 3, when the retractable folding braces 3 are folded and stored under the frame, $1^{st}$, $2^{nd}$, $3^{rd}$, $4^{th}$ casters 41, 42, 43, 44 are higher than the folded retractable folding braces 3 and can touch the ground to roll;

A handle 10 sets on the rear border 12 to carry the folding worktable easily;

The left and right bosses 13, 14 have slots, holes as the tool storage and/or has a socket 18 to supply power to electric tools or the lights etc.

The board 2 is a double sided board 2 including a workboard 21 and an antiskid board 22 which are mutually fit and fixed together.

Referring now to FIG. 1, FIG. 2 and FIG. 3, the frame 1 has a mounting surface for the board 2, the top surface of the left and right bosses 13, 14 is higher than the mounting surface, front and rear borders 11, 12 each has two guiding limit plates 51, 52, 53, 54, wherein $1^{st}$, $2^{nd}$ guiding limit plates 51, 52 are fixed on front border 11 and $3^{rd}$, $4^{th}$ guiding limit plates 53, 54 are fixed on rear border 12; $1^{st}$, $2^{nd}$, $3^{rd}$, $4^{th}$ guiding limit plates 51, 52, 53, 54 each equips with $1^{st}$, $2^{nd}$, $3^{rd}$, $4^{th}$ spring lockers 61, 62, 63, 64 below; when the double sided board 2 is inserted into the mounting surface via the slope of the No. 1, 2, 3, 4 guiding limit plates 51, 52, 53, 54, it is located by the left and right bosses 13, 14 and the $1^{st}$, $2^{nd}$, $3^{rd}$, $4^{th}$ guiding limit plates 51, 52, 53, 54 to stop the horizontal direction movement, and it is also locked onto frame 1 by the No. 1, 2, 3, 4 spring locks 61, 62, 63, 64 to stop the vertical direction movement. According to FIG. 2, when the MDF 21 is facing up, the board 2 can be used as a worktable or creeper and when the antiskid board 22 is facing up, the board 2 can be used as scaffold or carrier. In the present embodiment, the spring lockers 61, 62, 63, 64 are eccentric shaft spring lockers according to FIG. 1.

In this example, the work-board 21 is a MDF board 21. Referring now to FIG. 1, the MDF board 21 is fixed to the antiskid board 22 by a pounding plate 7, pressing plates 81, 82, 83, 84 and fastening screws 9, the position of No. 1, 2, 3, 4 pressing plates 81, 82, 83, 84, $1^{st}$, $2^{nd}$, $3^{rd}$, $4^{th}$ grooves of the MDF board 211, 212, 213, 214 and $1^{st}$, $2^{nd}$, $3^{rd}$, $4^{th}$ bulges of the antiskid board 221, 222, 223, 224 all correspond to $1^{st}$, $2^{nd}$, $3^{rd}$, $4^{th}$ spring lockers 61, 62, 63, 64; when the MDF board and antiskid board fit together, the positions of the grooves 211, 212, 213, 214 and bulges 221, 222, 223, 224 are the same size, and the MDF board 21 and antiskid board 22 are locked on the frame 1 together by the spring lockers 61, 62, 63, 64.

The antiskid board 22 is a plastic board, the surface of the antiskid board 22 has antiskid grid pattern 225 according to FIG. 1, such as triangle, rectangle, diamond or other polygon pattern etc. to be beautiful and antiskid.

The grooves of the antiskid board also can be bulges of the antiskid board. The bulges of the antiskid board 221, 222, 223, 224 insert the grooves of the MDF board 211, 212, 213, 214, and then used the pressing plates 81, 82, 83, 84 and fastening screws 9 to fix the MDF board 21 and antiskid board 22 together.

As on FIG. 12, there is a pounding board 7 being fixed on one side of the MDF board 21 and a protractor 215 on the other side. The size of pounding board 7 and MDF board 21 fixing together is the same with antiskid board 22. The MDF board 21 is the main work platform. For preferred embodiment, said MDF board 21 is printed with a drawing of protractor 215 to satisfy the design demand of the user. There is a through hole 216 of the MDF board on the center of the protractor 215, to match the through hole 226 of the antiskid board 22. When the MDF board 21 and antiskid board 22 are fitted together, the MDF board through-hole 216 and antiskid board through-hole 226 are the same size and concentric. The user can do drilling work on the worktable. This through-hole doesn't influence the overall surface of MDF board 21. It at least can drill hole to the plank that is racked on the through hole. For example, to drill plank etc. by small sized impact drill. We can place plank on the through-hole and the drilling point to the through-hole, and use small sized impact drill to drill the hole. The drill bit can penetrate through-hole and doesn't damage MDF board 21. The MDF board 21 can also print with pattern or logo to improve aesthetic appearance. The double sided board 2 is formed by pounding board 7, MDF board 21 and antiskid board 22 by screws 9.

To facilitate the electrical operation, as on FIG. 8, at outer flank on one side of the bosses, there is equipped with socket 18.

The pounding board 7 is made by rigid material as base board for knife cutting or striking tools. For example, on the pounding board 7, one can pound iron wire by hammer, etc.

As on FIGS. 1 & 9, the antiskid board 22 is plastic board and has antiskid grid pattern 225.

As on FIGS. 3, 5 & 7, to guarantee the strength of frame 1, in the frame 1, between the front and rear rung 11, 12, there are connection with four paralleled $1^{st}$, $2^{nd}$, $3^{rd}$, $4^{th}$ support props 151, 152, 153, 154. Between a pair of short border connects with a support shaft 16. The support shaft 16 fixes with left and right buckles 161, 162 at its bottom. As in FIGS. 5, 6 & 7, when it is used to fix retractable folding braces 3, they are fixed separately on left cylinder buckle 3131 and right cylinder buckle 3231.

When the double sided board 2 is placed onto the front border 11 and rear border 12 of the frame 1, the top surface of the front border 11 and rear border 12 is used as the double sided board 2 attachment face. The top surface of left and right bosses 13, 14 is higher than the top surface of double sided board 2 which is placed on frame 1.

Said retractable folding braces 3 is a foldable and retractable foot frame. It has retractable structure that can have four support props that can have at least one stretching and retracting. They are formed left and right H shaped support frames 31, 32 separately with left and right rungs 313, 323 and two support props. Namely, at the opposite sides of frame bottom, the left and right H shaped support frame 31, 32 are separately hinged to the left and right bosses 13, 14 at the bottom of frame 1.

The left "H" shaped brace 31 has $1^{st}$, $2^{nd}$ legs of the left "H" shaped brace 311, 312 and left rung 313. And on the left rung 313 there is left cylinder buckle 3131 that matches to left buckle 161.

The right "H" shaped brace 32 has $1^{st}$, $2^{nd}$ legs of the right "H" shaped support frame 321, 322 and right rung 323. And on the right rung 323 there is right cylinder buckle 3231 that matches to right buckle 162.

On $1^{st}$ & $2^{nd}$ legs of the left "H" shaped brace 311, 312 and $1^{st}$, $2^{nd}$ legs of the right "H" shaped support frame 321, 322, there are equipped with left $1^{st}$ & $2^{nd}$ props with unidirectional folding spindles 3111, 3121 and right left $1^{st}$ & $2^{nd}$ props with unidirectional folding spindles 3211, 3221. Each prop connects to bottom of frame 1.

When said retractable folding braces 3 is unfolded, each prop, the bottom of the frame 1 and each leg form a triangle. The retractable folding braces 3 is supported at the bottom of frame 1 and limited by limit units of legs 33, as shown on FIG. 7.

When the four legs of the retractable folding braces 3 are retracted and folded inward, said left $1^{st}$ & $2^{nd}$ props with unidirectional folding spindles 3111, 3121 & said right $1^{st}$ & $2^{nd}$ props with unidirectional folding spindles 3211, 3221 are folded along the unidirectional folding spindles and drive the retractable folding braces 3 to fold inward. Said left & right cylinder buckle 3131, 3231 and left & right buckles 161, 162 will be locked together. The retractable folding braces 3 are folded under the bottom of the frame 1 and the four casters that fixed on the bottom of the frame 1 touch the ground for rolling.

As worktable installation manual: firstly unfold the retractable folding braces 3, $1^{st}$ & $2^{nd}$ legs of the left "H" shaped brace 311, 312 and $1^{st}$ & $2^{nd}$ legs of the right "H" shaped brace 321, 322 will be stretched and made the double sided board 2 at the height of average adult body's crotch level. The MDF 21 of the double sided board 2 face upwards and the installation is completed. If there are tools, they can be placed on the board or inserted in the slots or holes on the bosses of the frame 1. The product can fully support the weight of household small sized devices.

If the worktable needs to be folded and put aside, easily fold the retractable folding braces 3 and carry it with handle 10 to put in storage box, trunk or other store location.

Example 2

Now refer to FIG. 8 which is a left view of the worktable & FIG. 9 is a reference view of the scaffold usage:

Other structures are the same with implement example 1. As shown in FIG. 9, for the double sided board 2, the antiskid board 22 is facing upward. It can be use as operating plate or scaffold that the operation staff may stand on antiskid board 22. On the basis of example 1, the frame 1 has a handle 10 on the outwards of one of the rungs for easy carry of worktable when folded. Or said handle 10 is on the front and rear borders 11, 12.

When the retractable folding braces 3 is unfolded, the legs need no stretch and can be used with antiskid board 22 of double sided board 2.

When the left boss 13 is equipped with tool storing slots or holes, the power socket bar can be fixed to the outer side of the right boss 14. It is convenience to use electronic tools such as driller etc.

Because of the antiskid board 22 has antiskid grid pattern 225, it is stable and antiskid when it is used as scaffold.

If the users need to fetch goods from high storage, or other movements, the users can stand on antiskid board 22. But the folding worktable is unstable if its height is too much. Therefore, the legs should not be stretched out. And an average adult can easily stand onto it. Compare to MDF 21, the antiskid board 22 has antiskid grid pattern 225 that can make the stand on the antiskid board 22 more stable.

Example 3

Now refer to FIG. 3 that is a reference view of the folded and stored worktable without the board; FIG. 5 is a top view of the folded and stored worktable; FIG. 7 is another reference view of the worktable, wherein the Part. C is a reference view of the limit unit 33 at the legs and the bottom of the frame 1. FIG. 8 is a left view of the worktable; and FIG. 10 is a reference view of the creeper usage.

On the basis of example 1, MFD 21 of the double sided board 2 faces upwards, and the retractable folding braces 3 is folded in structure as FIGS. 3 & 10. It is creeper mode for easy car repair under vehicle.

As shown in FIG. 5 & FIG. 7, for the retractable folding braces 3, the width of the left "H" shaped brace 31 is smaller than the right H shaped brace 32. When the retractable folding braces 3 is folded, No. 1 and 2 legs of the left "H" shaped brace 311, 312 of the left "H" shaped brace 31 is at inner side of No. 1& 2 legs of the right "H" shaped support frame 321, 322 of the right "H" shaped brace 32.

As shown in FIG. 5, FIG. 7 & FIG. 8, to make casters flexible for turning, the $1^{st}$, $2^{nd}$ casters 41, 42 on the left side are at the outer side of the left "H" shaped brace 31. They can only roll back and forth as fixed back casters. The $3^{rd}$, $4^{th}$ casters 43, 44 on the right are at the inner side of the right "H" shaped brace 32. They can turn flexibly as direction guiding front casters. The pull ring 17 is set at the same side of front casters on the outer edge of frame, namely on the right boss 14.

When this folding worktable be used as repair skateboard, the casters turn agility. MDF 21 is easy to clean & good heat insulation. Using the handle, it can ease to move.

Example 4

Now refer to FIG. 11. FIG. 11 is a reference view of the carrier usage. On the basis of example 1, the antiskid board 22 of the double sided board 2 face upwards; the retractable folding braces 3 is folded as shown in FIG. 3. The retractable folding braces 3 under the bottom of the frame 1 do not touch the ground. The folding worktable can be used for moving tool. As shown in FIG. 8, a pull ring 17 is set to one side of the boss's bottom. It can easily be fastened to rope and pulled or pushed as carrier.

At the moment the folding worktable touches the ground via $1^{st}$, $2^{nd}$, $3^{rd}$, $4^{th}$ casters 41, 42, 43, 44, and make it roll forward or backward. The antiskid board 22 can support goods firmly and the antiskid grid pattern 225 can prevent goods sliding during the transit. When the pull ring 17 is fastened to rope at the outer side of the right boss 14, it can use as a carrier. This folding worktable is strong enough to support common home devices and appliances.

What is claimed is:

1. A folding table comprising:
   a frame having a first frame side and an opposing second frame side;
   a table surface located on the first frame side;
   a plurality of casters provided on the second frame side; and
   a plurality of legs pivotably connected to the frame, wherein the table is operable between a first configuration and a second configuration, and wherein
   in the first configuration, the legs are arranged to support the frame on a supporting surface, and
   in the second configuration, the legs are moved away from the supporting surface and at least some of the casters are arranged to touch the supporting surface, wherein the frame comprises a first side frame, a second side frame, a first end frame and a second end frame, the plurality of legs comprising a first pair of legs pivotably connected to the first end frame and a second pair of legs pivotably connected to the second end, wherein the folding table further comprises:
   one or more support bars fixedly connected between the first side frame and the second side frame;
   a first pair of folding brackets; and
   a second pair of folding brackets; wherein said one or more support bars comprise a first support bar and a second support bar, and wherein the first pair of folding brackets are arranged to foldably connect the first pair of legs to the first support bar and the second pair of folding brackets are arranged to foldably connect the second pair of legs to the second support bar.

2. The folding table according to claim 1, wherein the table surface is dimensioned for mounting on the side frames.

3. The folding table according to claim 1, wherein the side frames comprise a plurality of spring locks configured to secure the table surface to the frame.

4. The folding table according to claim 1, wherein the casters comprise a first caster pair and a second caster pair, the first caster pair mounted on one of the end frames, and second caster pair mounted on another one of the end frames.

5. The folding table according to claim 1, wherein the frame further comprises a handle pivotably mounted on one of the side frames.

6. The folding table according to claim 1, wherein each of the legs has a first leg end and an opposing second leg end, the first leg end pivotably connected to one of the end frames, such that
   when the table is arranged in the second configuration, the second leg end locates near the table surface on the second frame side; and
   when the table is arranged in the first configuration, the second leg end is moved away from the table surface and the second frame side.

7. The folding table according to claim 6, wherein when the table is arranged in the second configuration, the legs are substantially parallel to the side frames.

8. The folding table according to claim 6, wherein the first pair of legs are spaced from each other by a first space having a first distance, the second pair of legs are spaced from each other by a second space having a second distance smaller than the first distance, such that when the table is arranged in the second configuration, at least part of the second pair of legs are located within the first space.

9. The folding table according to claim 6, wherein each leg comprises a first leg section and a second leg section, the first leg section including the first leg end, the second leg section including the second leg end, and wherein part of the second leg section is retractable from the first leg section.

10. The folding table according to claim 1, wherein the table surface comprises a first surface and an opposing second surface, the second surface having an anti-skid pattern, and wherein the table surface is configured for mounting on the first frame side in a first arrangement or a second arrangement, such that,
   in the first arrangement, the second surface is facing the second frame side, and
   in the second arrangement, the first surface is facing the second frame side.

11. The folding table according to claim 10, wherein the first surface comprises a fiberboard.

12. The folding table according to claim 10, wherein the first surface comprises a protractor pattern.

13. The folding table according to claim 10, wherein the table surface comprises a first board having the first surface and a second board having the second surface, the first board separable from the second board.

14. The folding table according to claim 1, wherein the frame further comprises:
   a support shaft connected between the first end frame and the second end frame, the support bars and the support shaft arranged to support the table surface.

15. A folding table comprising:
   a frame having a first frame side and an opposing second frame side;
   a table surface located on the first frame side;
   a plurality of casters provided on the second frame side; and
   a plurality of legs pivotably connected to the frame, wherein the table is operable between a first configuration and a second configuration, and wherein
   in the first configuration, the legs are arranged to support the frame on a supporting surface, and
   in the second configuration, the legs are moved away from the supporting surface and at least some of the casters are arranged to touch the supporting surface, wherein the frame comprises two side frames and two end frames, wherein the table surface is dimensioned for mounting on the side frames and the legs are pivotably connected to the end frames, and wherein the side frames comprise a first side frame and a second side frame, and the end frames comprise a first end frame and a second end frame, the frame further comprising:
   one or more support bars connected between the first side frame and the second side frame, and
   a support shaft connected between the first end frame and the second end frame, the support bars and the support shaft arranged to support the table surface, and wherein the support shaft comprises a first bracket having a first slot and a second bracket having a second slot, and wherein the plurality of legs comprise a first pair of legs pivotably connected to the first end frame and a second pair of legs pivotably connected to the second end frame, said table further comprising:
   a first rung connected between the first pair of legs to form a first H-shaped brace, the first rung comprising a first buckle; and
   a second rung connected between the second pair of legs to form a second H-shaped brace, the second rung comprising a second buckle, such that when the table is arranged in the second configuration,
   the first rung is located near the table surface on the second frame side and the first buckle is arranged to engage with the first slot so as to secure the first H-shaped brace to the support shaft; and
   the second rung is also located near the table surface on the second frame side and the second buckle is arranged to engage with the second slot so as to secure the second H-shaped brace to the support shaft.

* * * * *